United States Patent
Mishaeloff

(10) Patent No.: US 11,903,787 B2
(45) Date of Patent: Feb. 20, 2024

(54) MATRICES FOR DENTAL RESTORATION

(71) Applicant: Itay Mishaeloff, Tel Aviv (IL)

(72) Inventor: Itay Mishaeloff, Tel Aviv (IL)

(73) Assignee: Iveneer LTD, Petach Tikva (IL)

( * ) Notice: Subject to any disclaimer, the term of this patent is extended or adjusted under 35 U.S.C. 154(b) by 20 days.

(21) Appl. No.: 17/173,216

(22) Filed: Feb. 11, 2021

(65) Prior Publication Data

US 2021/0236240 A1 Aug. 5, 2021

Related U.S. Application Data

(62) Division of application No. 15/856,087, filed on Dec. 28, 2017, now Pat. No. 10,952,815.

(51) Int. Cl.
*A61C 5/85* (2017.01)
*A61C 5/20* (2017.01)
*A61C 13/15* (2006.01)

(52) U.S. Cl.
CPC .................. *A61C 5/85* (2017.02); *A61C 5/20* (2017.02); *A61C 19/003* (2013.01)

(58) Field of Classification Search
CPC .... A61C 5/20; A61C 5/30; A61C 5/35; A61C 5/70; A61C 5/77; A61C 5/85; A61C 5/88; A61C 9/0033; A61C 13/082; A61C 13/081
See application file for complete search history.

(56) References Cited

U.S. PATENT DOCUMENTS

| | | | |
|---|---|---|---|
| 2,611,182 A | 9/1952 | Toffelmire | |
| 3,421,222 A | 1/1969 | Newman | |
| 4,303,389 A | 12/1981 | Salsarulo | |
| 4,718,849 A | 1/1988 | van Weissenfluh | |
| 4,997,367 A | 3/1991 | Kassel | |
| 5,114,341 A * | 5/1992 | Kassel | A61C 5/85 433/39 |
| 5,730,592 A | 3/1998 | Meyer | |
| 6,142,778 A | 11/2000 | Summer | |
| 2005/0089813 A1 | 4/2005 | Slone | |
| 2005/0089814 A1 | 4/2005 | Slone | |
| 2005/0287491 A1 | 12/2005 | Slone | |
| 2009/0208896 A1* | 8/2009 | Clark | A61C 5/50 433/215 |
| 2014/0199652 A1 | 7/2014 | McDonald | |
| 2017/0011949 A1 | 1/2017 | Saiki et al. | |
| 2017/0119499 A1 | 5/2017 | Clark | |
| 2017/0215992 A1 | 8/2017 | Clark | |

(Continued)

FOREIGN PATENT DOCUMENTS

WO 2014/053480 A1 4/2014

OTHER PUBLICATIONS

ISR; Israel Patent Office; Jerusalem; Apr. 27, 2023.
Written Opinion of the International Searching Authority; Israel Patent Office; dated Apr. 27, 2023.

*Primary Examiner* — Jacqueline T Johanas
*Assistant Examiner* — Shannel Nicole Belk
(74) *Attorney, Agent, or Firm* — Patshegen IP; Moshe Pinchas

(57) ABSTRACT

A matrix adapted is for the specific tooth type, and is positioned on the tooth to covers the tooth, so that an injected curable material is encased by the matrix over the tooth. When the curable material has cured, the matrix is removed, resulting in a veneer on the tooth.

10 Claims, 9 Drawing Sheets

(56) References Cited

U.S. PATENT DOCUMENTS

| | | |
|---|---|---|
| 2018/0280116 A1* | 10/2018 | Hansen .................... A61C 5/85 |
| 2019/0008320 A1 | 1/2019 | Cheng |
| 2019/0020116 A1 | 1/2019 | Hammes et al. |
| 2019/0083208 A1 | 3/2019 | Hansen et al. |
| 2019/0201165 A1 | 7/2019 | Mishaeloff |

* cited by examiner

MATRICES FOR DENTAL RESTORATION

CROSS-REFERENCES TO RELATED APPLICATIONS

This application is a Divisional of commonly owned U.S. patent application Ser. No. 15/856,087, entitled: MATRICES FOR DENTAL RESTORATION, filed on Dec. 28, 2017, the disclosure of which is incorporated by reference herein.

TECHNICAL FIELD

The present invention relates generally to apparatus and methods for dental restoration. More particularly, the present invention relates to apparatus and methods for placing dental veneers on teeth.

BACKGROUND OF THE INVENTION

Cosmetic dentistry generally relates to the process of enhancing the aesthetics of the dental crown, that portion of the tooth beyond the gum line which is covered with enamel. One example of such a process comprises putting a veneer on the tooth or putting a mold, made from a dental impression, on the tooth, filling the mold with a dental composite or acrylic, to create the veneer, while the mold is separate from the teeth, and then transferring the veneer from the mold to the tooth. The veneer is placed on the tooth and is then cured or otherwise hardened. The veneer is now integral with the tooth, and now may be shaped or polished, for example, by techniques including resurfacing the tooth. These aforementioned techniques are fairly expensive and time consuming, as they require considerable preparation, and usually cannot be performed in a single dental office visit.

SUMMARY OF THE INVENTION

Embodiments of the present invention provide a matrix adapted for the specific tooth type (e.g., premolar, molar, canine, incisor, palatal, lingual) being treated in a single treatment, which results in a veneer on the tooth, which may then be resurfaced, for an aesthetically pleasing appearance.

Embodiments of the invention are such that the procedure for placing a veneer on a tooth with the disclosed matrix is a highly accurate process, extremely hygienic and sanitary, and results in a smooth veneer indistinguishable from the tooth the veneer has repaired.

Embodiments of the invention are directed to a matrix for a dental treatment. The matrix comprises: a facial member for covering a tooth, at least a portion of the facial member configured to cover the tooth such that a cavity is created between the facial member and the tooth, and, the portion of the facial member that forms the cavity is includes at least one aperture; and, first and second tab members disposed on opposite sides of the facial member, each of the first and second tab members extending outward and of a thickness for frictionally fitting between the covered tooth and each of the respective adjacent teeth, to maintain the matrix in place; and, at least a portion of each of the first and second tab members including a cut-out portion configured for seating the matrix at the gum, and allowing the matrix to be moved about the gum, for example, pivoted, to adjust the dimensions of the cavity, at a first end of the tab member, each of the first and second tab members configured for being bent inward, such that each second end of the tab member forms a gripping portion, which when moved adjusts the dimensions of the cavity.

Optionally, the facial member includes a facial portion configured for covering the tooth along the buccal surface, and a chewing surface cap extending from the facial portion and configured for covering at least the chewing surface of the tooth, and the chewing surface cap includes the at least one aperture.

Optionally, each of the first and second tab members include: a tab, at least a portion of the tab including the cut out portion; a wing extending from the tab; and, the tab meets the wing at a fold line, the wing of each tab member being bendable about the fold line to form the gripping member.

Optionally, the facial portion includes oppositely disposed lateral edges and the tabs of the first and second tab members extend from the respective oppositely disposed lateral edge.

Optionally, wherein the chewing surface cap extends between the oppositely disposed lateral edges at a first end of the facial portion.

Optionally, the facial portion includes a gingival edge between the oppositely disposed lateral edges at a second end, opposite the first end, the gingival edge configured for contacting a tooth slightly below the gum line.

Optionally, the gingival edge is configured for contacting the tooth approximately 1 mm below the gum line.

Optionally, at least the facial portion includes a light transmissive material.

Optionally, the light transmissive material allows for the transmission of ultra violet (UV) light. Optionally, the facial member and first and second tab members are arranged as an integral member.

Optionally, the integral member is of a substantially uniform thickness and includes a flexible material.

Optionally, the facial portion includes an outer buccal surface and an inner dental surface, and the inner dental surface is textured so as to replicate the texture of the tooth.

Optionally, the at least one aperture includes a plurality of apertures.

Optionally, the cut-out portions are configured for contacting the tooth approximately 1 mm below the gum line.

Embodiments of the invention are directed to a method for repairing a tooth. The method comprises: providing a matrix for a dental treatment, placing the matrix over a tooth to form a cavity between the tooth and the facial member; bending the first and second tab members inward to surround the tooth; placing a curable material into the cavity; and, curing the curable material to form a veneer on the tooth. The matrix comprises: a facial member for covering a tooth, at least a portion of the facial member of a light transmissive material and at least a portion the facial material configured to cover the tooth such that a cavity is created between the facial member and the tooth, and, the portion of the facial member that forms the cavity is includes at least one aperture; and, first and second tab members disposed on opposite sides of the facial member, each of the first and second tab members extending outward and of a thickness for frictionally fitting between the covered tooth and each of the respective adjacent teeth, to maintain the matrix in place; and, at least a portion of each of the first and second tab members including a cut-out portion configured for seating the matrix at the gum, and allowing the matrix to be moved about the gum, for example, pivoted, to adjust the dimensions of the cavity, at a first end of the tab member, each of the first and second tab members configured for being bent inward, such that each second end of the tab member forms a gripping portion, which when moved adjusts the dimensions of the cavity.

Optionally, the facial member includes a gingival edge at an end opposite the end with the at least one aperture; and, the method additionally comprises placing the gingival edge into contact with the tooth below the gum line.

Optionally, the method additionally comprises removing the matrix from the tooth.

Optionally, the curing is performed by applying light to the curable material.

Optionally, curable material is an Ultra Violet (UV) light curable material and the light applied to the UV curable material includes UV light.

Optionally, the bending the first and second tab members inward includes bending the second ends of each of the tab members outward to form a gripping portion for the matrix, and, moving the matrix at the gripping portion to adjust the dimensions of the cavity.

Optionally, the moving the matrix at the gripping portion to adjust the dimensions of the cavity includes causing the matrix to pivot about the gums on opposite sides of the tooth to adjust the dimensions of the cavity and control the thickness of the veneer (produced by the method).

Optionally, the placing the curable material into the cavity includes injecting the curable material into the cavity.

Optionally, the injecting the curable material into the cavity includes injecting under pressure to eliminate air bubbles and air gaps in the curable material.

Optionally, the bending the first and second tab members inward to surround the tooth creates at least one of a palatal shell (wall) for upper teeth or a lingual shell (wall) for lower teeth for building missing portions of the tooth.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1A:
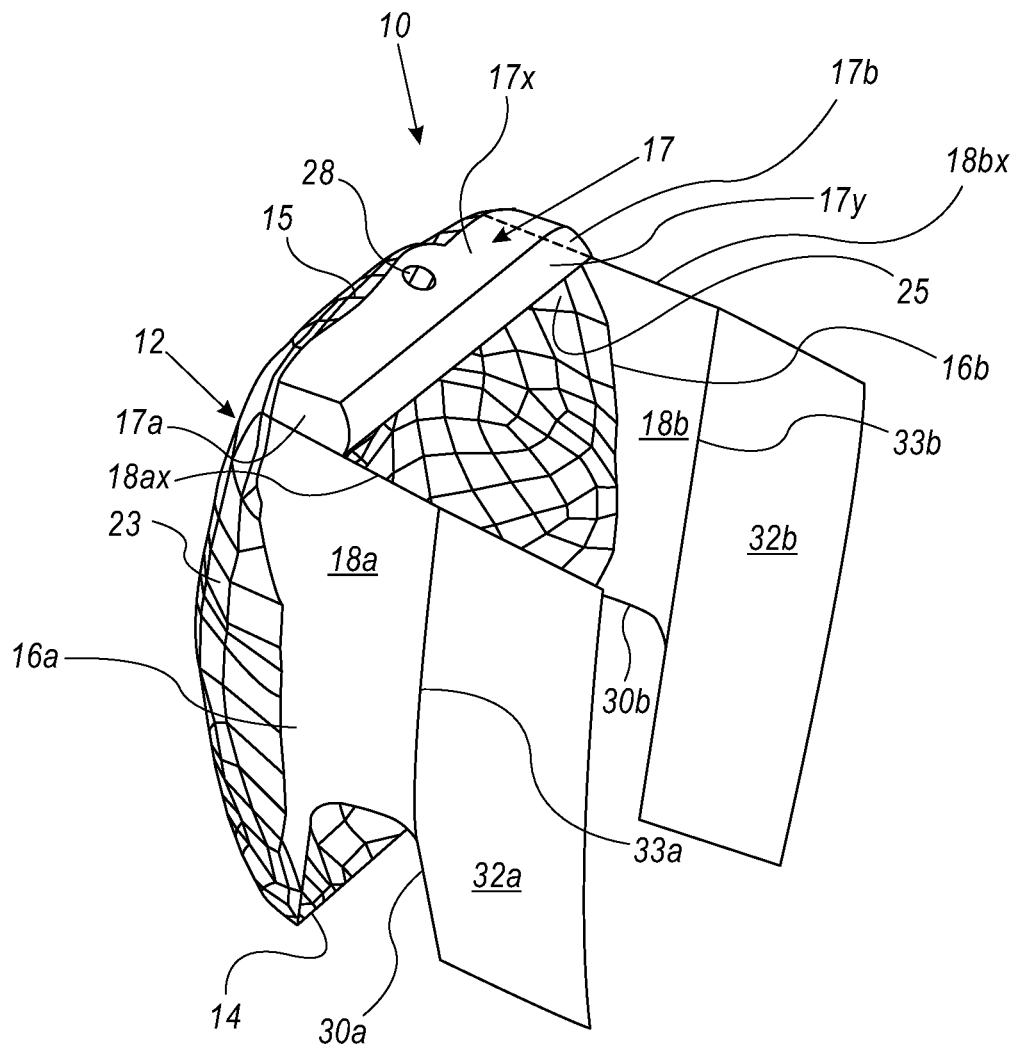
FIGS. 1A and 1B are perspective views of a matrix for use in creating a veneer in accordance with embodiments of the invention.
Figure 1B:
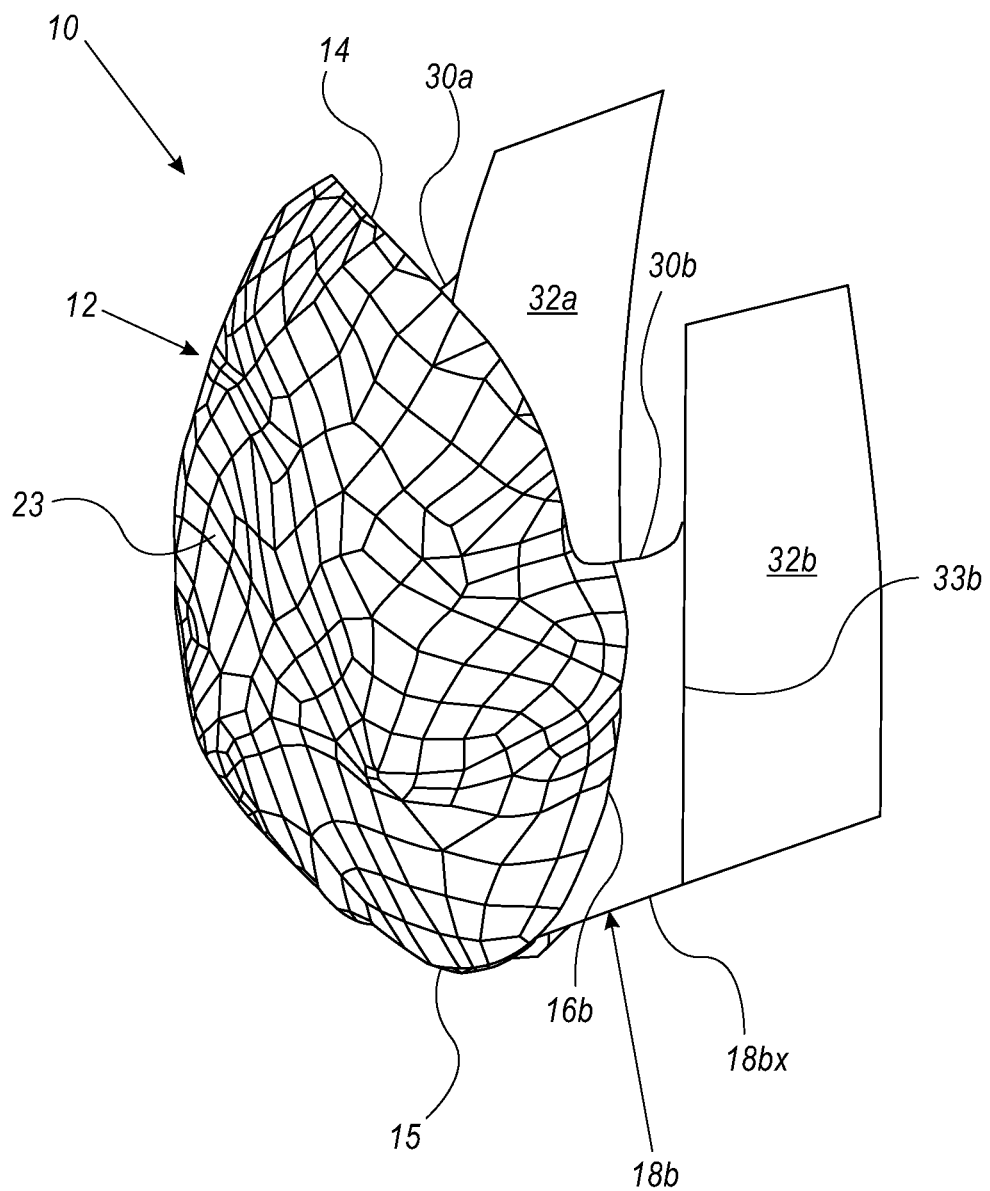

Throughout this document, references to directions and orientations, such as inward, outward, upper, lower, lateral and the like. The references to these directions and orientations are exemplary, for describing and explaining the present invention, and embodiments thereof, and are not limiting in any way.

FIGS. 1A, 1B, 2A, 2B and 3 show a matrix 10 for being fitted over a tooth. The matrix 10, is, for example, a unitary member, for being placed over, and typically onto, a tooth, in order that, for example, a flowable and curable material can be injected into the matrix 10 to create a veneer on the tooth. The matrix 10 is such that it is positioned on the tooth in accordance with the desired thickness of the veneer. Once the injected material is cured, the matrix 10 is removed from the tooth. With the matrix 10 removed from the tooth, the resultant veneer is now integral with the tooth. The tooth may then be subjected to other procedures, such as resurfacing, grinding, polishing, and the like.

The matrix 10 includes a facial portion 12 which is of a contoured shape to conform with the shape of the outer surface of the tooth. The facial portion 12 extends longitudinally between a gingival edge 14, which is designed to be flush with the tooth at the gum line, approximately 1 mm underneath the gum line, and a chewing surface edge 15, and laterally, between lateral edges 16a, 16b. The gingival edge 14, chewing surface edge 15 and lateral edges 16a, 16b define a periphery for the facial portion 12. A chewing surface cap 17 extends along the chewing surface edge 15, between lateral sides 17a, 17b. The lateral sides 17a, 17b are flush and typically coplanar with oppositely disposed tabs 18a, 18b. The tabs 18a, 18b extend from the lateral edges 16a, 16b of the facial portion 12.

The facial portion 12 includes an outer buccal surface 23, and an inner dental surface 25. The inner dental surface 25 is, for example, shaped and textured, for example, in a nonuniform manner, to provide (e.g., replicate) the texture of the natural tooth type which it is designed to restore, and may also include perikymata and mamelonn. The facial portion 12 is, for example, contoured (e.g., curved) (FIGS.

Figure 2A:
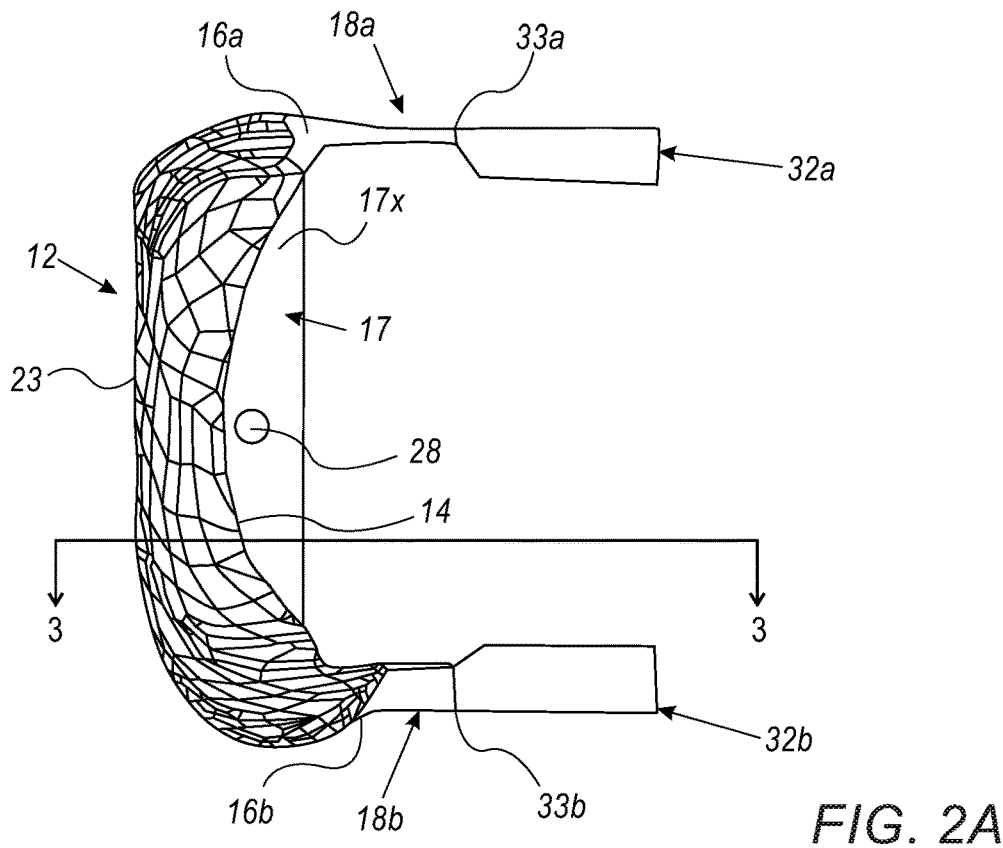
FIG. 2A is a bottom view of the matrix of FIGS. 1A and 1B.
Figure 2B:
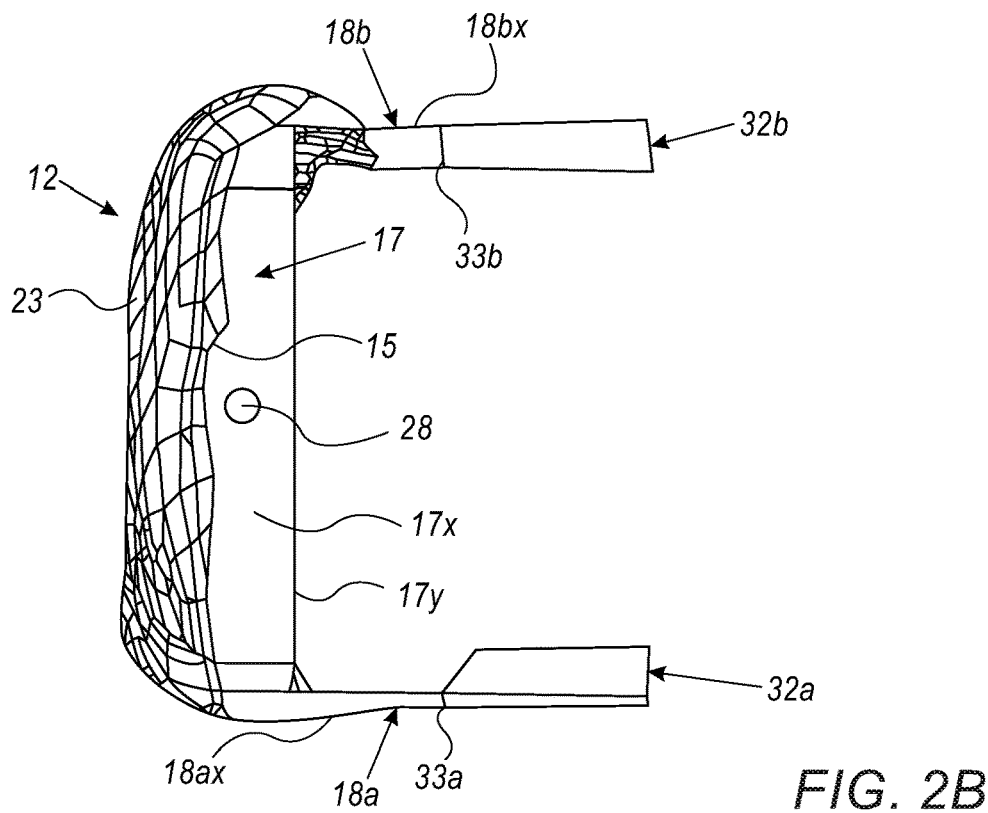
FIG. 2B is a top view of the matrix of FIGS. 1A and 1B.
Figure 3:
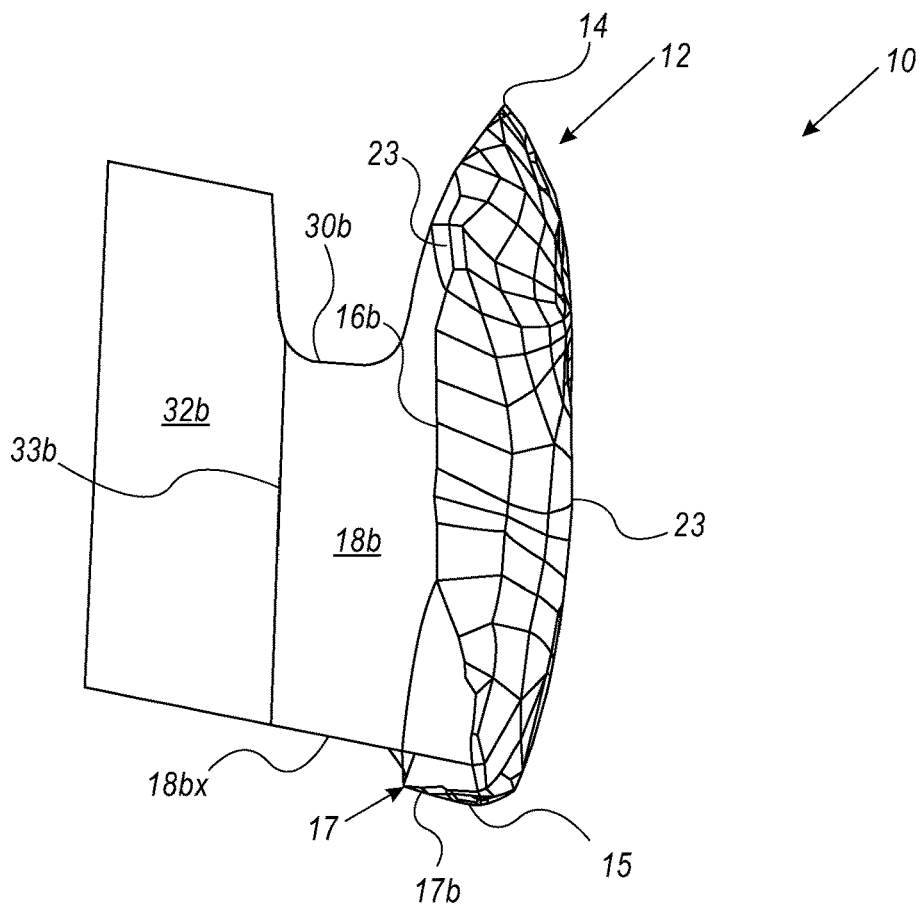
FIG. 3 is a cross sectional view of the matrix of FIGS. 1A and 1B taken along line 3-3 of FIG. 2A.

1A and 1B), and slightly asymmetrical, as shown in FIGS. 2A and 2B, in order to accommodate the shape of the tooth, for example, for a left palatal incisor as shown in the drawing figures.

A gingival edge 14 is designed to be flush with the gum line. For example, the matrix 10 is designed to be inserted to cover the tooth such that the gingival edge 14 sits approximately 1 mm from the gum line.

A chewing surface cap 17 includes a platform 17x and an inwardly curved lip 17y, which extends inward from the platform 17x. The lateral sides 17a, 17b of the chewing surface cap 17 join to the lateral edges 16a, 16b as well as the tabs 18a, 18b along the tab edges 18ax, 18bx. The chewing surface cap 17, for example, at the platform 17x, includes an aperture 28, through which a flowable material is injected. The aperture 28 is circular in shape, but other shapes, such as square, rectangular, oval, triangular, combinations thereof, and the like, are also suitable, provided they accommodate a syringe, needle or other injection structure. While a single central aperture 28 is shown, multiple apertures at multiple positions on the chewing cap 17 are also permissible.

Laterally disposed tabs 18a, 18b, extend from the respective lateral edges 16a, 16b of the facial portion 12, and a portion thereof is typically attached to the chewing surface cap 17, at each lateral side 17a, 17b. The tabs 18a, 18b are such that they define an interproximal surface between adjacent teeth, creating a frictional engagement in the space between the teeth, in order to support the matrix 10 when it is engaged on the requisite tooth.

Each of the tabs 18a, 18b includes a cut-out portion 30a, 30b, to receive and fit the gums, allowing the matrix 10 to sit over the tooth. The cut-out portions 30a, 30b are dimensioned to sit underneath or over the gums, and to allow the matrix 10 to be pivoted, moving the matrix 10 forward and rearward (when the tabs 18a, 18b are pushed or pulled causing the pivoting), as desired by the professional, in order to control the thickness of the material which will be inserted into the matrix 10, and therefore, controlling the thickness of the veneer on the tooth, as detailed below. The tabs 18a, 18b are such that they confine composite material to the matrix 10, preventing it from leaving the matrix 10 and entering into the oral cavity and/or contacting other teeth, such as teeth adjacent to the tooth being treated. The tabs 18a, 18b are flexible, e.g., of a flexible material, so that they can be folded or otherwise bent inward during operation of the matrix 10 (detailed below), keeping flowable composite (for example, and curable) material from getting outside of the matrix 10, as well as preventing saliva, blood and other body fluids from entering the area (e.g., including the cavity 54) covered (encased) by the matrix 10, keeping the process clean. Additionally, the inwardly bent tabs 18a, 18b serve as a wall which is used to build missing portions of teeth (by filling with flowable composite, and, for example, curable, material, as detailed below), by forming a palatal shell or wall, for upper teeth, and a lingual shell or wall for lower teeth.

Wings 32a, 32b, also of a flexible material, e.g., the same material as the tabs 18a, 18b, and integral with each of the respective tabs 18a, 18b, extend from the respective tabs 18a, 18b, and are foldable or otherwise bendable from the tabs at or about the respective fold lines 33a, 33b (weakened portions which allow for bending and/or folding). The folded wings 32a, 32b are typically folded about the respective fold lines 33a, 33b so as to be aligned with each other (for example, in an orientation perpendicular now inwardly bent tabs 18a, 18b), creating a gripping portion 56 (FIGS. 6A and 6B), which the professional grips with fingers or instruments and moves the matrix 10, to adjust the cavity 54 (FIG. 4) (space) between the tooth and the facial portion 12, for the veneer.

The matrix 10, for example, is a unitary member, shaped for a particular tooth, such as an incisor, for example, an left palatal (upper) incisor as shown in FIGS. 4-9, or other teeth including pre-molars, molars and canine, both palatal and lingual (lower). The matrix 10, at least the facial portion 12, is made of a light transmissive material, such as a translucent or transparent material, to allow the passage of light through to the matrix 10, the light, such as ultraviolet (UV) light, for curing the flowable composite material, which was previously injected into the matrix 10, as detailed below. The translucent or transparent material includes thermoplastic materials, such as medical grade acrylic, polypropylene, polyethylene, ABS, nylon, siliconized rubber, which are biocompatible, inert and non-toxic. Alternately, the chewing surface cap 17 and tabs 18a, 18b may also be made from medical grade nylon, polyvinyl chloride (PVC), polyethylene or polypropylene.

All of the materials of the matrix 10 are, for example, of an approximately uniform thickness, of approximately 0.025 mm to 0.5 mm. The matrix 10 is typically disposable, but may also be for multiple uses.

Figure 4:
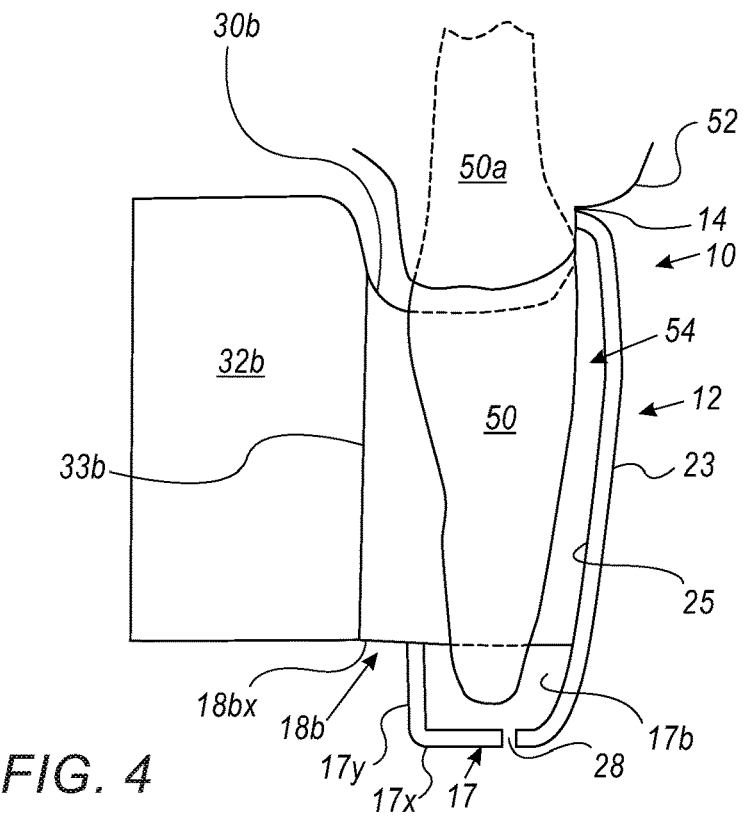
FIG. 4 is a cross sectional view of a tooth with the matrix placed over it when creating the veneer on the tooth in accordance with embodiments of the invention.

Attention is now directed additionally to FIGS. 4-9, where the matrix 10 is shown in operation for creating a veneer on a tooth 50. Initially, as shown in FIG. 4, the matrix 10 is placed over the tooth 50 (with the tooth root 50a extending into the gum). This placement is such that the facial portion 12 at the gingival edge 14 is in contact with and flush with the tooth 50 just below the gum line 52, e.g., approximately 1 mm, such that the cavity 54 is closed from the rest of the mouth, and that the finish line of the veneer 66 (FIG. 9) is just underneath the gum line 52. Additionally, the tabs 18a, 18b occupy the space between the tooth 50 and each adjacent tooth, creating a frictional engagement, to hold the matrix 10 in its proper position on the tooth 50. The cut-out portions 30a, 30b are such that they allow the matrix 10 to pivot about the gum, to be properly positioned over the tooth 50. This allows for adjustment of the thickness of the veneer 66 (FIG. 9) for the tooth 50, by the pushing or pulling of the tabs 18a, 18b, moving the facial portion 12 of the matrix 10 with respect to the tooth 50 (adjusting the dimensions of the cavity 54 between the facial portion 12 and the tooth 50). The cavity 54 is of a desired thickness for the veneer 66 (FIG. 9) between the facial portion 12 and the tooth 50.

The cut-out portions 30a, 30b, for example, are designed such that along with parts of the facial portion 12 contact the tooth 50 interproximally between the tooth 50 and each adjacent tooth, so as to close the matrix 10 (and its cavity 54, such that the matrix 10 encases the tooth 50). For example, the cut out portions 30a, 30b are also designed to sit below the gum line 52, approximately 1 mm below the gum line 52 (where the cut out portions 30a, 30b contact the tooth 50).

Figure 5:
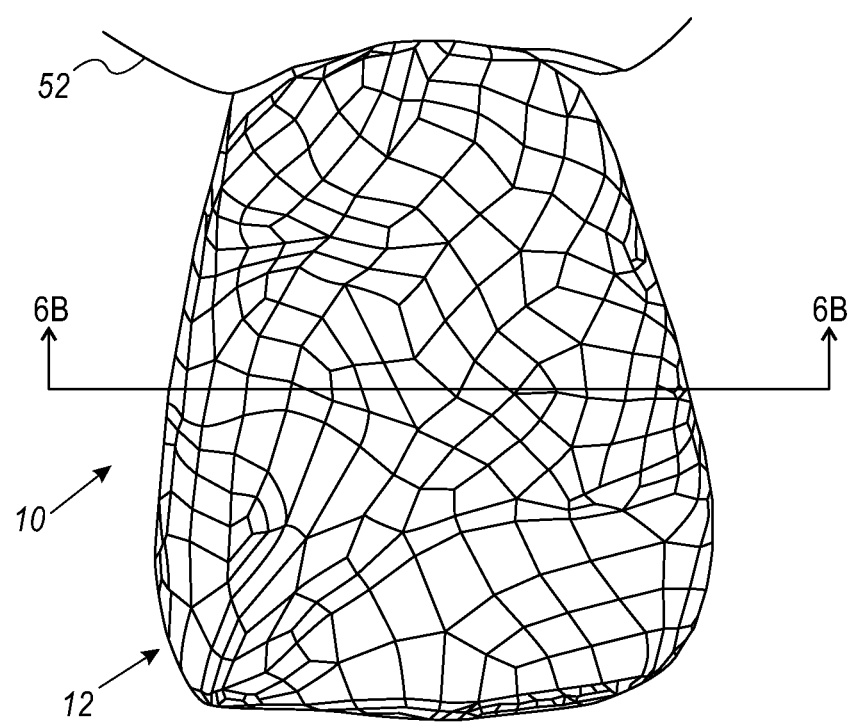
FIG. 5 is a perspective view showing the tooth as covered by the matrix when creating the veneer on the tooth in accordance with embodiments of the invention.
Figure 6A:
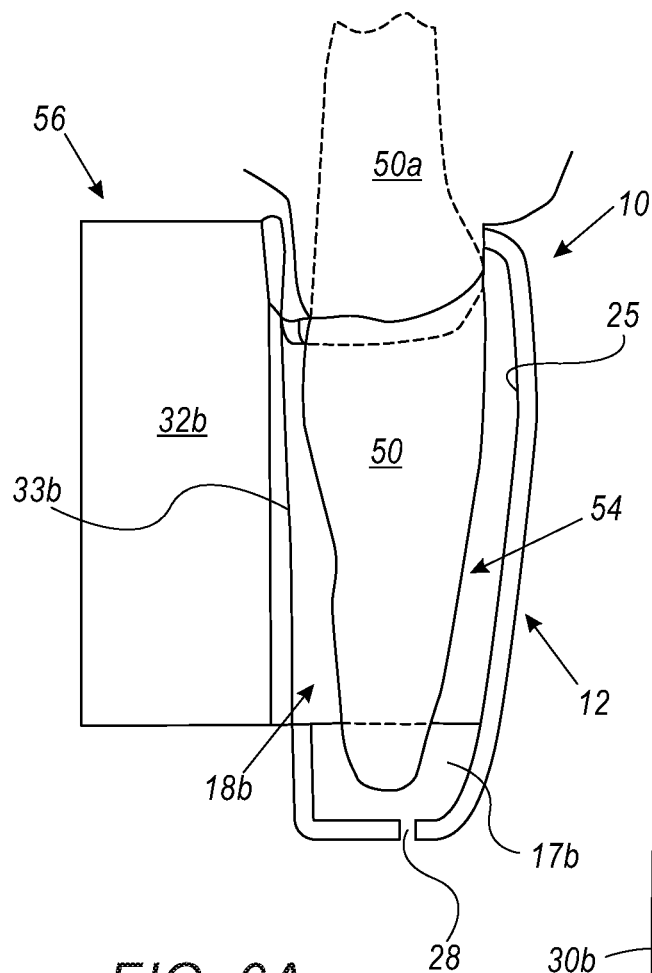
FIG. 6A is a cross sectional view of the tooth as covered by the matrix in accordance with FIG. 5.
Figure 6B:
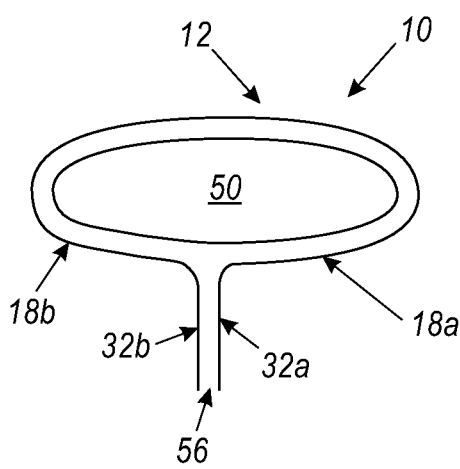
FIG. 6B is a cross sectional view of the tooth as covered by the matrix taken along line 6B-6B of FIG. 5.

In FIG. 5, the tooth 50 is covered by the matrix 10, as the tabs 18a, 18b are bent or folded inward, and the wings 32a, 32b are folded along fold lines 33a, 33b, to at least approximately perpendicular to the respective tabs 18a, 18b, so as to form a gripping portion 56, as shown in FIGS. 6A and 6B. This gripping portion 56 is gripped by the professional, by fingertips or instruments and manipulates the matrix 10, to pivot about the gum, resulting in the cavity 54 being adjusted to the desired thickness for the veneer. Optionally, the overlapping wings 32a, 32b may be secured together with an adhesive, or by mechanical fasteners, or combinations thereof. The matrix 10 now encases the tooth 50.

Figure 7:
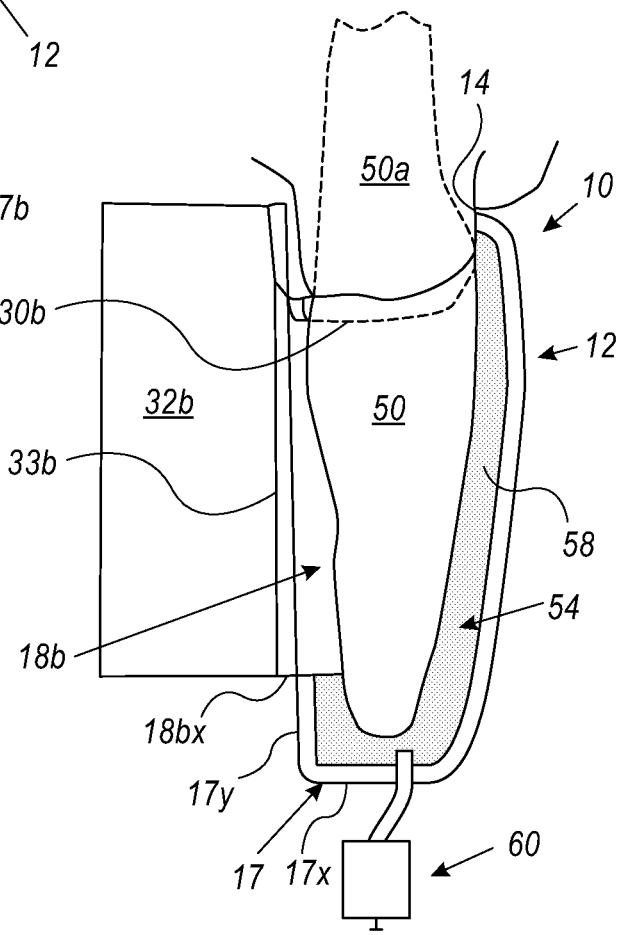
FIGS. 7 and 8 are cross sectional views of FIG. 6A showing the veneer forming process in accordance with embodiments of the invention.

With the thickness of the veneer set, based on the cavity 54 set (adjusted) between the facial portion 12 of the matrix 10 and the tooth 50, flowable and restorative material, such as a UV light curable composite (material) 58 is injected, by a syringe 60 through the aperture 28 in the chewing surface cap 17, into the cavity 54, as shown in FIG. 7. The injection by the syringe 60 is under pressure (of the syringe plunger), and fills the cavity 54, which is a closed space, in a manner which eliminates air bubbles and air gaps in the injected composite material in the cavity 54. As a result of all air bubbles and air gaps being eliminated, oxygen cannot reach the dental composite and a nonoxygen inhibited layer is formed in the cavity 54, allowing for all layers of the composite to be well cured, as detailed below. Because the cavity 54 is closed (i.e., as edges of the matrix 10 contact the tooth 50, as the matrix 10 encloses the tooth 50), there is no contamination of the composite material from blood, saliva, body fluids, other contaminants and the like. The injection is complete when composite material exits the matrix 10 through the aperture 28.

Example composites include, ESPE 6020A3 Filtek® Z250 Universal Restorative Refill, from 3M, St. Paul, Minn., and Herculite™ Ultra Flow Nanohybrid Flowable Composite from Kerr. An example syringe which may be used is a 1-4 g Syringe.

Figure 8:
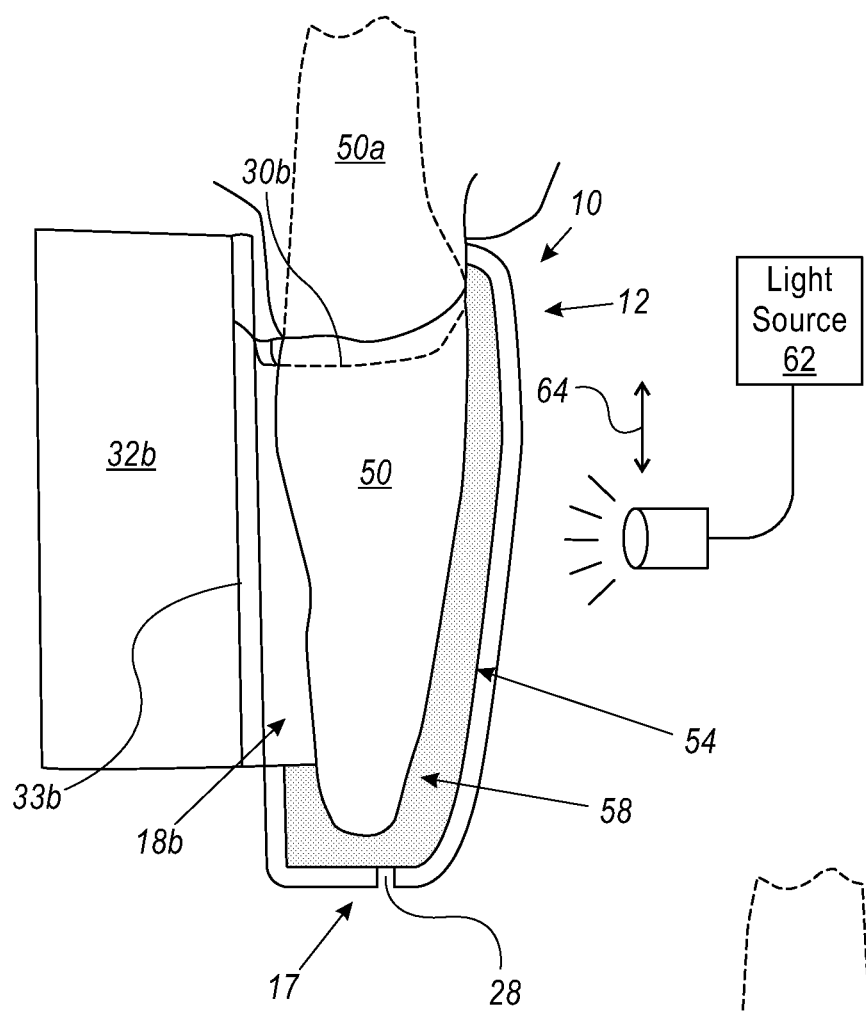

Turning to FIG. 8, the syringe 60 is now removed, and the cavity 54 is full with the composite 58. Curing of the composite 58 with UV light, from an instrument 61 which emits UV light from a UV light source 62 is applied to the matrix 10 at the facial portion 12. The UV light instrument may be moved for localized curing on the tooth 50, the movement represented by the double headed arrow 64. The translucency or transparency of the facial portion 12 allows the UV light to cure the composite material 58, to form the veneer 66 (FIG. 9) on the tooth 50, the veneer being integral with the tooth 50 due to the curing.

Figure 9:
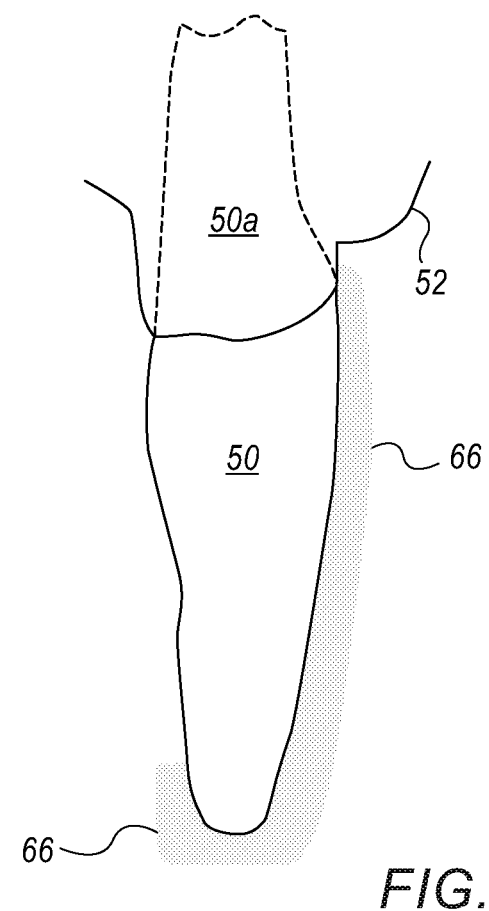
FIG. 9 shows the veneer, as formed on the tooth in accordance with the veneer forming process in accordance with embodiments of the invention.

Once the composite 58 has cured, the matrix 10 is removed. The veneer 66 is now on the tooth 50, as shown in FIG. 9. Optionally, the now-formed veneer 66, which is integral with the tooth 50 may be resurfaced or otherwise treated, by the professional.

Figure 10A:
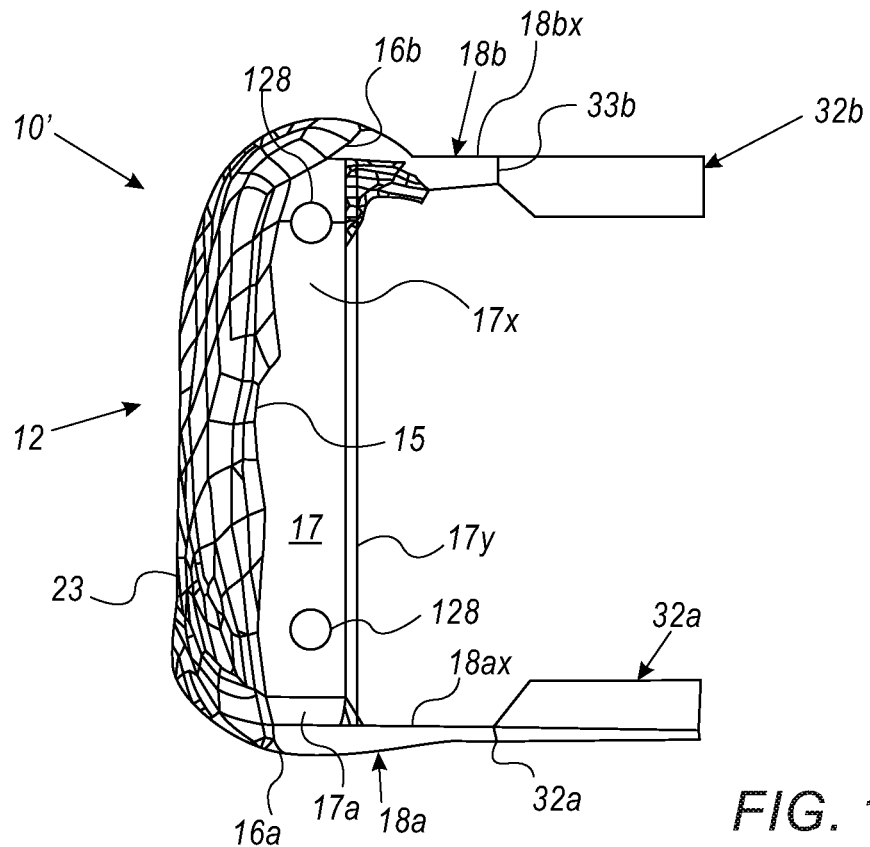
FIG. 10A is a bottom view of an alternate embodiment matrix in accordance with the present invention.
Figure 10B:
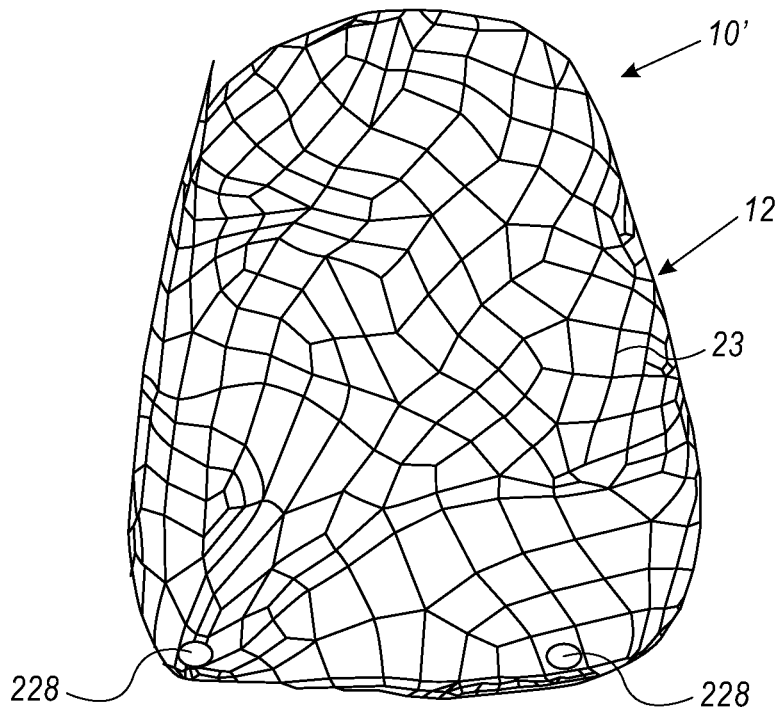
FIG. 10B is a perspective view of the alternate embodiment matrix of FIG. 10A covering a tooth.

FIGS. 10A and 10B show an alternative matrix 10', which is similar to that of the matrix 10 detailed above, and elements are numbered similarly, except that the chewing cap 17, at its platform 17x has two apertures 128. Through these two apertures 128, similar to the aperture 28 of the matrix 10, detailed above, flowable materials may be injected into the cavity 54 between the facial portion and the tooth, to create the veneer, when the matrix 10', is over a tooth, as shown for example in FIG. 10B.

Figure 11:
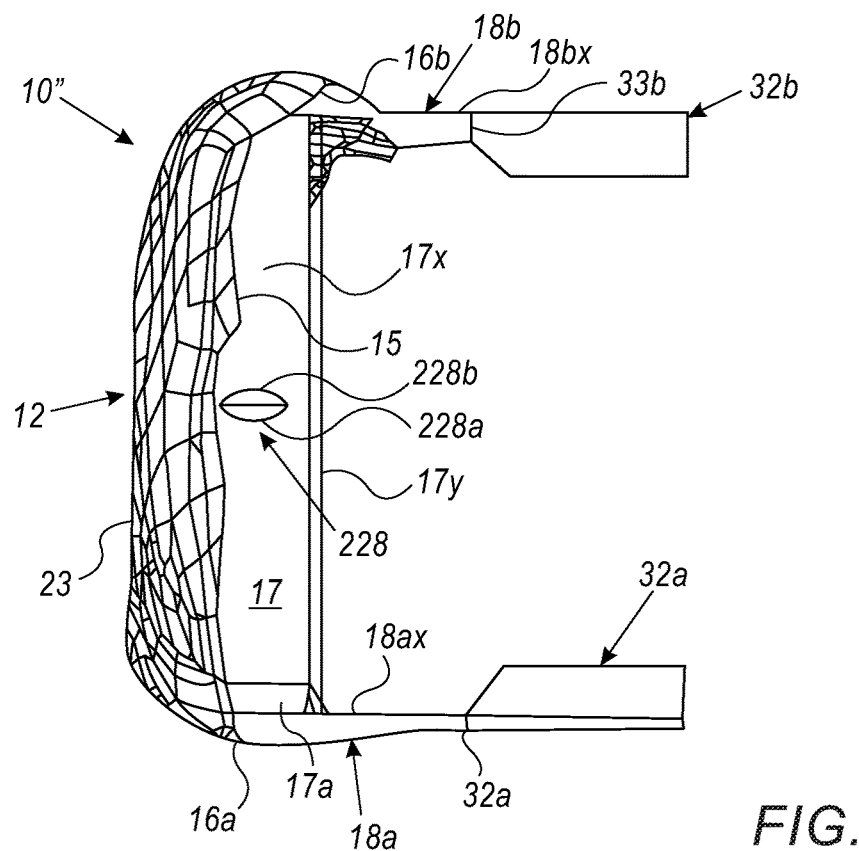
FIG. 11 is a bottom view of an another alternate embodiment matrix in accordance with the present invention; and, FIG. 12 is a perspective view of another alternate embodiment matrix in accordance with the present invention covering a tooth.

FIG. 11 shows an alternative matrix 10", which is similar to that of the matrix 10 detailed above, and elements are numbered similarly, except that the chewing cap 17, at its platform 17x an aperture 228, formed of dual apertures 228a, 228b, for example, which are semicircular in shape. Through these two apertures 228a, 228b, flowable materials may be injected into the cavity 54 between the facial portion 12 and the tooth, to create the veneer, when the matrix 10", is over a tooth.

Figure 12:
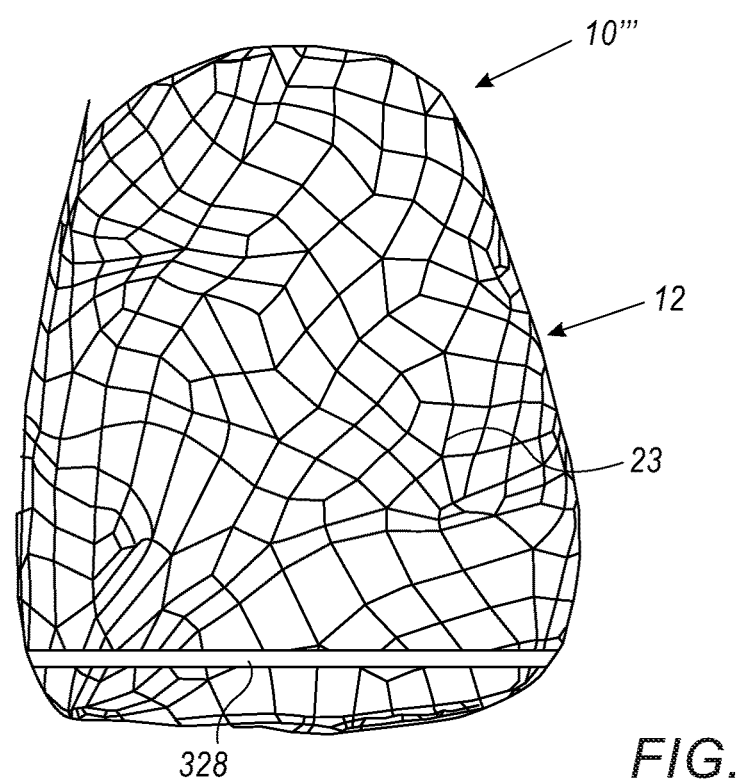

FIG. 12 shows an alternative matrix 10''' over a tooth. The matrix 10''' is similar to that of the matrix 10 detailed above, and elements are numbered similarly, except that the chewing cap 17, at its platform 17x a slot 328 has replaced the aperture 28. Through this slot 328, flowable materials may be injected into the cavity 54 between the facial portion 12 and the tooth, to create the veneer, when the matrix 10''', is over a tooth.

While the matrix and methods for its use, including creating a veneer, are shown for human teeth, the disclosed matrix and methods for its use are also suitable for animal teeth.

It will be appreciated that the above descriptions are intended only to serve as examples, and that many other embodiments are possible within the scope of the present invention as defined in the appended claims.

The invention claimed is:

1. A method for treating a tooth comprising:
providing a matrix comprising:
a facial member for covering a tooth, at least a portion of the facial member including a light transmissive material and at least a portion the facial member configured to cover the tooth such that a cavity is created between the facial member and the tooth, and the portion of the facial member that forms the cavity is includes at least one aperture; and,
first and second tab members disposed on opposite sides of the facial member, each of the first and second tab members extending outward and of a thickness for frictionally fitting between the covered tooth and each of the respective adjacent teeth, to maintain the matrix in place; and, at least a portion of each of the first and second tab members including a cut-out portion configured for seating the matrix at the gum, and allowing the matrix to be moved about the gum to adjust the dimensions of the cavity, at a first end of each of the first and second tab members, each of the first and second tab members configured for being bent inward, such that a second end of each of the first and second tab member members forms a gripping portion, the gripping portion when moved adjusts the dimensions of the cavity;
forming a cavity of set dimensions around portions of the tooth to receive material for a veneer on the tooth, comprising:
placing the matrix over a tooth to form the cavity between the tooth and the facial member; and
moving the first and second tab members toward each other at least partially around the tooth, and/or moving the matrix about the gum at the cut-out portions of the first and second tab members, to set the dimensions of the cavity;
placing a curable material into the formed cavity through the at least one aperture to form a veneer on the tooth; and,
curing the curable material of the formed veneer on the tooth.

2. The method of claim 1, wherein the facial member includes a gingival edge at an end opposite the end with the at least one aperture; and the method additionally comprises placing the gingival edge into contact with the tooth below the gum line.

3. The method of claim 1, additionally comprising: removing the matrix from the tooth.

4. The method of claim 1, wherein the curing is performed by applying light to the curable material.

5. The method of claim 4, wherein the curable material is an Ultra Violet (UV) light curable material and the light applied to the UV curable material includes UV light.

6. The method of claim 1, wherein the moving the first and second tab members toward each other includes bending the second ends of each of the first and second tab members outward to form the gripping portion for the matrix, and moving the matrix at the gripping portion to adjust the dimensions of the cavity and control the resulting thickness of the veneer.

7. The method of claim 6, wherein the moving the matrix at the gripping portion to adjust the dimensions of the cavity includes causing the matrix to pivot about the gums on opposite sides of the tooth to adjust the dimensions of the cavity.

8. The method of claim 1, wherein the placing the curable material into the cavity includes injecting the curable material into the cavity.

9. The method of claim 8, wherein the injecting the curable material into the cavity includes injecting under pressure to eliminate air bubbles and air gaps in the curable material.

10. The method of claim 1, wherein the moving the first and second tab members toward each other to surround the tooth to form at least one of a palatal shell for upper teeth or a lingual shell for lower teeth, for building missing portions of the tooth.

\* \* \* \* \*